United States Patent [19]

Bosso et al.

[11] B 4,001,156

[45] Jan. 4, 1977

[54] METHOD OF PRODUCING EPOXY GROUP-CONTAINING, QUATERNARY AMMONIUM SALT-CONTAINING RESINS

[75] Inventors: Joseph F. Bosso, Lower Burrell; Marco Wismer, Gibsonia, both of Pa.

[73] Assignee: PPG Industries, Inc., Pittsburgh, Pa.

[22] Filed: Mar. 28, 1974

[21] Appl. No.: 455,686

[44] Published under the second Trial Voluntary Protest Program on March 2, 1976 as document No. B 455,686.

Related U.S. Application Data

[60] Continuation-in-part of Ser. No. 277,697, Aug. 3, 1972, abandoned, which is a continuation-in-part of Ser. Nos. 158,063, June 29, 1971, abandoned, and Ser. No. 167,470, July 29, 1971, and Ser. No. 129,267, March 29, 1971, abandoned, and Ser. No. 100,825, Dec. 22, 1970, abandoned, and Ser. No. 100,834, Dec. 22, 1970, abandoned, said Ser. No. 158,063, is a division of Ser. No. 772,366, Oct. 31, 1968, abandoned, said Ser. No. 167,470, is a continuation-in-part of Ser. No. 840,847, July 10, 1969, abandoned, and Ser. No. 840,848, July 10, 1969, abandoned, and Ser. No. 100,825, , and Ser. No. 100,834, , said Ser. No. 100,825, and Ser. No. 100,834, each is a continuation-in-part of Ser. No. 56,730, July 20, 1970, abandoned, which is a continuation-in-part of Ser. No. 772,366, Oct. 31, 1968, abandoned.

[52] U.S. Cl. .................. 260/29.2 EP; 260/47 EP; 260/47 EQ

[51] Int. Cl.$^2$ ........................................ C08G 51/24
[58] Field of Search ... 260/47 EP, 47 EN, 29.2 EP, 260/59, 2 EP, 78.4, 77.5; 204/181

[56] References Cited

UNITED STATES PATENTS

| | | | |
|---|---|---|---|
| 2,676,166 | 4/1954 | Webers | 260/85.7 |
| 2,681,901 | 6/1954 | Wiles et al. | 260/47 |
| 3,257,347 | 6/1966 | Woods et al. | 260/29.2 EP |
| 3,301,804 | 1/1967 | Zora et al. | 260/29.2 |

*Primary Examiner*—Donald E. Czaja
*Assistant Examiner*—T. Pertilla
*Attorney, Agent, or Firm*—William J. Uhl

[57] ABSTRACT

Resins containing epoxy groups and quaternary ammonium groups can be prepared by reacting an epoxy group-containing material and an amine acid salt. Boron is added to the composition either by adding a member selected from the group consisting of aqueous boric acid solution, boric acid, and compounds hydrolyzable to form boric acid in aqueous medium to the reaction product or by utilizing a material selected from the group consisting of amine salts of boric acid and amino-containing esters of boric acid as the amine salt constituent. It has now been found that when the reaction between the amine acid salt and the epoxy is conducted in the presence of a controlled amount of water, more uniform and desirable products can be obtained.

14 Claims, No Drawings

METHOD OF PRODUCING EPOXY GROUP-CONTAINING, QUATERNARY AMMONIUM SALT-CONTAINING RESINS

CROSS-REFERENCE TO RELATED APPLICATIONS

This application is a continuation-in-part of copending application Ser. No. 277,697, filed Aug. 3, 1972, now abandoned, which in turn is a continuation-in-part of copending applications (A) Ser. No. 158,063, filed June 29, 1971, now abandoned; (B) Ser. No. 167,470, filed July 29, 1971; (C) Ser. No. 129,267, filed Mar. 29, 1971, now abandoned; and (D) Ser. Nos. 100,825 and 100,834, both filed Dec. 22, 1970, and both now abandoned. Application Ser. No. 158,063 (A) in turn is a division of copending Application Ser. No. 772,366, filed Oct. 31, 1968, now abandoned; Application Ser. No. 167,470 (B) is, in turn, a continuation-in-part of copending applications Ser. Nos. 840,847 and 840,848, both filed July 10, 1969, both now abandoned, as well as a continuation-in-part of copending applications Ser. Nos. 100,825 and 100,834 (D), both filed Dec. 22, 1970; application Ser. Nos. 100,825 and 100,834 (D), both, in turn, being continuations-in-part of copending application Ser. No. 56,730, filed July 20, 1970, now abandoned, which in turn, is a continuation-in-part of copending application Ser. No. 772,366, filed Oct. 31, 1968, now abandoned.

BACKGROUND OF THE INVENTION

Recently, there has been developed a group of water-dispersible quaternary ammonium salt containing resins which have utility as coating resins in general and, particularly, in aqueous electrodepositable compositions.

These resins are prepared by reacting an epoxy group-containing organic material, preferably a resin which is a polyepoxide containing a plurality of epoxy groups with an amine acid salt, yielding a resin preferably containing epoxy groups and containing quaternary ammonium salt groups.

It has been found that the reaction of the epoxy group and the amine acid salt is frequently rapid and exothermic and that difficulty is sometimes encountered in resin reproducibility. These problems are even more apparent when large scale preparations are attempted.

DESCRIPTION OF THE INVENTION

It has now been found that substantial improvements in reaction control, resin reproducibility and resin quality can be obtained where an epoxy group-containing material is reacted with an amine acid salt to provide quaternary ammonium salt groups, by conducting the reaction in the presence of a controlled amount of water.

The resins which can be prepared by the process of this invention are characterized as epoxy group-containing, ungelled, water-dispersible resins containing quaternary ammonium salt groups. It has been found that the presently-preferred resins are based on polyepoxide resins, wherein the resultant resin contains at least one free epoxy group per average molecule and wherein the resin optionally contains oxyalkylene groups and/or the salt forming the quaternary ammonium salt is the salt of an acid having a dissociation constant greater than $1 \times 10^{-5}$.

Generally, the quaternary ammonium salt may be the salt of boric acid and/or an acid having a dissociation constant greater than boric acid, including organic and inorganic acids. Upon solubilization, at least a portion of the salt is preferably a salt of an acid having a dissociation constant greater than about $1 \times 10^{-5}$. Preferably the acid is an organic carboxylic acid. The presently preferred acid is lactic acid.

The preferred resins contain at least one epoxy group per average molecule and preferably contain about 0.05 to about 16 percent by weight nitrogen in the form of chemically-bound quaternary ammonium base salt groups.

The epoxy group-containing organic material can be any monomeric or polymeric compound or a mixture of compounds having a 1,2-epoxy group. It is preferred that the epoxy-containing material have a 1,2-epoxy equivalency greater than 1.0, that is, in which the average number of 1,2-epoxy groups per molecule is greater than 1. It is preferred that the epoxy compound be resinous, that is, a polyepoxide, i.e., containing more than one epoxy group per molecule. The polyepoxide can be any of the well-known epoxides. Examples of these polyepoxides have, for example, been described in U.S. Pat. Nos. 2,467,171; 2,615,007; 2,716,123; 3,030,336; 3,053,855 and 3,075,999.

A preferred class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be bis(4-hydroxyphenyl)2,2-propane, 4,4'-dihydroxybenzophenone, bis(4-hydroxyphenyl)1,1-ethane, bis(4-hydroxyphenyl)1,1-isobutane; bis(4-hydroxytertiarybutylphenyl)2,2-propane, bis(2-hydroxynaphthyl)methane, 1,5-hydroxynaphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)2,2-propane, and the like.

There can also be used polyglycidyl esters of polycarboxylic acid which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate or by peracetic acid. Among such polyepoxides are the epoxy alicyclic ethers and esters which are well known in the art.

Another class of polyepoxides are those containing oxyalkylene groups in the epoxy molecule. Such oxyalkylene groups are typically groups of the general formula:

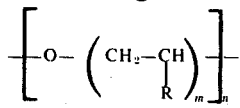

where R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. Usually the epoxy contains at least about one percent by weight or more, and preferably 5 percent or more of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide and 1,2-butylene oxide are especially useful alkylene oxides. Other monohydric alcohols can be, for example, the commercially available materials known as Cellosolves and Carbitols, which are monoalkyl ethers of polyalkylene glycols. The reaction of the monohydric alcohol and the polyepoxide is generally carried out in the presence of a catalyst; formic acid, dimethylethanolamine, diethylethanolamine, N,N-dimethylbenzylamine and, in some cases, stannous chloride are useful for this purpose.

Similar polyepoxides containing oxyalkylene groups can be produced by oxyalkylating the epoxy resin by other means, such as by direct reaction with an alkylene oxide.

The polyepoxide employed to produce the foregoing epoxies containing oxyalkylene groups contain a sufficient number of epoxy groups so that the average number of residual epoxy groups per molecule remaining in the product after the oxyalkylation is greater than 1.0. When oxyalkylene groups are present, the epoxy resin preferably contains from about 1.0 to about 90 percent or more by weight of oxyalkylene groups.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711; epoxylated aminomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

Another class of resins which may be employed are acrylic polymers containing epoxy groups. Preferably these acrylic polymers are polymers formed by copolymerizing an unsaturated epoxy-containing monomer, such as, for example, glycidyl acrylate or methacrylate.

Any polymerizable monomeric compound containing at least one $CH_2=C<$ group, preferably in terminal position, may be polymerized with the unsaturated glycidyl compounds. Examples of such monomers include:

1. Monoolefinic and diolefinic hydrocarbons, that is, monomers containing only atoms of hydrogen and carbon, such as styrene, alpha-methyl styrene, alpha-ethyl styrene, isobutylene (2-methyl propene-1), 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methyl-nonadecene-1, ethylene, propylene, butylene, amylene, hexylene, butadiene-1,3, isoprene, and the like.

2. Halogenated monoolefinic and diolefinic hydrocarbons, that is, monomers containing carbon, hydrogen, and one or more halogen atoms, such as alpha-chlorostyrene, alpha-bromostyrene, 2,5-dichlorostyrene, 2,5-dibromostyrene, 3,4-dichlorostyrene, ortho-, meta- and para-fluorostyrenes, 2,6-dichlorostyrene, 2,6-difluorostyrene, 3-fluoro-4-chlorostyrene, chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-dluoroethylene, 1,1-diiodoethylene, 1,1,2,2-tetrafluoroethylene, 1-chloro-2,2,2-tridluoroethylene, chlorobutadiene and other halogenated diolefinic compounds;

3. Esters of organic and inorganic acids, such as vinyl acetate, vinyl propionate, vinyl butyrate, vinyl isobutyrate, vinyl valarate, vinyl caproate, vinyl enanthate, vinyl benzoate, vinyl toluate, vinyl p-chlorobenzoate, vinyl-o-chlorobenzoate and similar vinyl halobenzoates, vinyl-p-methoxybenzoate, vinyl-o-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylatev decyl methacrylate, methyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromo-valerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl-3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1,butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyanoacrylate, ethyl alpha-cyanoacrylate, amyl alpha-cyanoacrylate and decyl alpha-cyano acrylate;

Dimethyl maleate, diethyl maleate, diallyl maleate, dimethyl fumarate, diethyl fumarate, dimethallyl fumarate and diethyl glutaconate;

4. Organic nitriles, such as acrylonitrile, methacrylonitrile, ethacrylonitrile, 3-octenenitrile, crotonitrile, oleonitrile, and the like.

In carrying out the polymerization reaction, a peroxygen type catalyst is ordinarily utilized. Useful catalysts for this purpose include acetyl benzoyl peroxide, hydroxyheptyl peroxide, methylethyl ketone peroxide, cyclohexanone peroxide, cyclohexyl hydroperoxide, 2,4-dichlorobenzoyl peroxide, cumene hydroperoxide, 5-butyl hydroperoxide, methyl amyl ketone peroxide, acetyl peroxide, lauroyl peroxide, benzoyl peroxide, methyl cyclohexyl hydroperoxide, p-chlorobenzyl peroxide, di-ti-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether and alpha, alpha-azobisisobutyronitrile may also be used as polymerization catalysts in the preparation of the interpolymers. Redox catalyst systems can also be employed.

The quality of the catalyst employed can be varied considerably; however, in most instance, it is desirable to utilize from about 0.1 percent to 2.0 percent. If high viscosities are desired, a low initial level of catalyst, followed by the necessary additions to get 100 percent conversion, is preferably employed. For low viscosity interpolymers, the bulk of the catalyst is added initially and later additions used only to secure desired conversions. Larger amounts of catalyst added initially give lower viscosities.

The acrylic polymer may likewise be prepared with monomers of the type such that the final polymer contains potential crosslinking sites. Such monomers include acrylamides or methacrylamides, their N-methylol or N-methylol ether derivatives, unsaturated monomers containing capped isocyanate groups, or aziridyl groups; and hydroxy-containing unsaturated monomers, for example, hydroxyalkyl acrylates.

Another method of producing acrylic polymers which may be utilized in this invention is to react an acrylic polymer containing reactive sites, such as carboxyl groups or hydroxyl groups, secondary amine groups or other active hydrogen-containing sites, with an epoxy-containing compound such as the diglycidyl ether of Bisphenol A or other polyepoxides as enumerated elsewhere herein, to provide an epoxy group-containing acrylic polymer.

Vinyl addition polymers which contain alicyclic unsaturation can be epoxidized to form an epoxy group-containing polymer.

Yet another class of polymers which are useful in preparing the resins of this invention are isocyanate group-containing polyurethanes. The isocyanate-terminated polyurethane prepolymers employed as starting materials according to the present invention may be obtained by the reaction of a selected polymeric glycol. The polyurethane polymers include those which are prepared from polyalkylene ether glycols and dissocyanates. The term "polyalkylene ether glycol" as used herein refers to a polyalkylene ether which contains terminal hydroxy groups. These compounds are derived from the polymerization of cyclic ethers such as alkylene oxides or dioxolane or from the condensation of glycols. They are sometimes known as polyoxyalkylene glycols, polyalkylene glycols, or polyalkylene oxide glycols, or dihydric polyoxyalkylenes. Those useful in preparing the products of this invention may be represented by the formula $HO(RO)_nH$, in which R stands for an alkylene radical and $n$ is an integer. Glycols containing a mixture of radicals, as in the compound $HO(CH_2OC_2H_4O)_nH$, or $HO(C_2H_4O)_n(C_3H_6O)_m(C_2H_4O)_nH$, can be used. These glycols are either viscous liquids or waxy solids. Polytetramethylene ether glycols, also known as polybutylene ether glycols, may be employed. Polyethylene ether and polypropylene ether glycols, having the above-indicated formula, are among the preferred glycols. Polyethylene ether glycols, poly-1,2-propylene ether glycols, polydecamethylene ether glycols, and poly-1,2-dimethyl ethyl ether glycols are representative of other operative compounds. The presently preferred glycols are polypropylene glycols with a molecular weight between about 300 and about 1000.

Any of a wide variety or organic polyisocyanates may be employed in the reaction, including aromatic, aliphatic, and cycloaliphatic dissocyanates and combinations of these types. Representative compounds include aromatic diisocyanates, such as 2,4-tolylene diisocyanate, mixtures thereof with 2,6-tolylene diisocyanates (usually about 80:20), 4,4-methylenebis(henylisocyanate), and m-phenylene diisocyanate. Aliphatic compounds such as ethylene diisocyanate, methylene diisocyanate, propylene-1,2-diisocyanate, butylene-1,3-diisocyanate, tetramethylene diisocyanate, hexamethylene diisocyanate, and decamethylene diisocyanate and alicyclic compounds such as 1,2- and 1,4-cyclohexylene diisocyanates, 4,4'-methylenebis(cyclohexylisocyanate) and isophorone diisocyanate are also operable. Arylene diisocyanates, i.e., those in which each of the two isocyanate groups is attached directly to an aromatic ring, react more rapidly with the polymeric glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Additional polyisocyanates which may be employed, for example, include: p,p'-diphenyl-methane diisocyanate, 3,3'-dimethyl-4,4'-biphenylene diisocyanate, 3,3'-dimethoxyoxy-4,4'-biphenylene diisocyanate, 3,3'-diphenyl-4,4'-biphenylene diisocyanate, 4-chloro-1,3-phenylene diisocyanate, 3,3'-dichloro-4,4'-biphenylene diisocyanate, and 1,5-naphthalene diisocyanate, and other polyisocyanates in a blocked or semi-inactive form such as bis-phenylcarbamates of tolylene diisocyanate, p,p'-diphenylmethane diisocyanate, p-phenylene diisocyanate, and 1,5-naphthalene and 1,5-tetrahydronaphthalene diisocyanate.

Instead of the hydrocarbon portion of the polyether glycols used in forming these polyurethane products being entirely alkylene, it can contain arylene or cycloalkylene radicals together with the alkylene radicals as, for example, in the condensation product of a polyalkylene ether glycol with alpha, alpha'-dibromo-p-xylene in the presence of alkali. In such products, the cyclic groups inserted in the polyether chain are preferably phenylene, naphthylene or cyclohexylene radicals or those radicals containing alkyl or alkylene substituents, as in the tolylene, phenylethylene or xylene radicals.

Also included in the polyurethane products are those made from a substantially linear polyester and an organic diisocyanate of the type previously described. Products of this sort are described in U.S. Pat. Nos. 2,621,166; 2,625,531 and 2,625,532. The polyesters are prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, and dicarboxylic acids such as malonic, maleic, succinic, adipic, pimelic, sebacic, oxalic, phthalic, terephthalic, hexahydroterephthalic, and para-phenylene-diacetic acids, decamethylene dicarboxylic acid, and the like. Another useful group of compounds for this purpose are the polyester amide resins having terminal hydroxyl groups. The preferred polyesters may be represented by the formula HO—[B—OOC—B'—COO]$_n$ BOH in which B and B' are hydrocarbon radicals derived from the glycol and dicarboxylic acid respectively and n is an integer. In the preparation of these polyesters, the glycol is used in at least slight excess so that the polyesters contain terminal hydroxyl groups which are available for reaction with the isocyanates. The same polyisocyanates and reaction conditions useful in preparing polyurethanes from the polyalkylene ether glycols are also useful with the polyesters.

Polyurethane glycols may also be reacted with an organic polyisocyanate to give isocyanate-terminated polyurethanes for use as starting materials in the present invention. The starting polyurethane glycol is prepared by reacting a molar excess of a polymeric glycol with an organic diisocyanate. The resulting polymer is a polyurethane containing terminal hydroxyl groups which may then be further reacted with additional polyisocyanate to produce the starting isocyanate-terminated polyurethane prepolymer.

Another starting polyurethane prepolymer may be such as disclosed in U.S. Pat. No. 2,861,981, namely, those prepared from a polyisocyanate and the reaction product of an ester of an organic carboxylic acid with an excess of a saturated aliphatic glycol having only carbon atoms in its chain and a total of 8 to 14 carbon atoms, at least one two-carbon atom branch per molecule, and having terminal hydroxyl groups separated by at least six carbon atoms.

It is obvious, from the above-described methods by which the polyurethane reaction products may be prepared and from the reactants used, that these products will contain a plurality of intralinear radicals of the formula 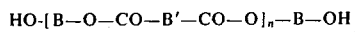, wherein the bivalent radical —O—X—O— is obtained by removing the terminal hydrogen atoms of the polymeric glycol, said glycol being selected from the group consisting of polyalkylene ether glycols, polyurethane glycols, polyalkylene arylene ether glycols, polyalkylenecycloalkylene ether glycols, polyalkylene ether-polythioether glycols, polyester amide glycols of the formula:

HO-[B—O—CO—B'—CO—O]$_n$—B—OH where B and B' are hydrocarbon radicals and n is an integerv and that a typical isocyanate-terminated polyurethane polymer produced from diisocyanates and dihydric glycols will, on an average, contain, at a 2:1 NCO—OH ratio, a plurality of intralinear molecules conforming to the formula:

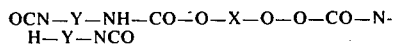

wherein —O—X—O— has the value given previously and Y is the polyisocyanate hydrocarbon radical.

In the preparation of the starting polyurethane polymer, an excess of the organic polyisocyanate of the polymeric glycol is used, which may be only a slight excess over the stoichiometric amount (i.e., one equivalent of polyisocyanate for each equivalent of the polymeric glycol). In the case of a diisocyanate and a dihydric polyalkylene ether, the ratio of NCO to OH of the polyol will be at least one and may be up to a 3:1 equivalent ratio. The glycol and the isocyanate are ordinarily reacted by heating with agitation at a temperature of 50°C., preferably 70°C. to 120°C. The ratio of organic polyisocyanate compound to polymeric glycol is usually and preferably between about 1.3:1 and 2.0:1.

The reaction is preferably, but not necessarily, effected in the absence of a solvent, when the prepolymer is a fluid at processing temperatures. When it is not, or when it is desired to employ a solvent, convenient solvents are inert organic solvents having a boiling range above about 90°C. when the reaction is to be carried out in open equipment. Lower boiling solvents may, of course, be used where the reaction is carried out in closed equipment to prevent boiling off the solvent at the temperatures of the reaction. Solvents boiling at substantially more than 140°C. are difficult to remove from a final chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer reaction stage, or after cooling of the formed prepolymer. The solvents to be used are preferably those in which the reactants have some solubility but in which the final chain-extended product is insoluble. Ketones, tertiary alcohols and esters may be used. The aliphatic hydrocarbon solvents such as the heptanes, octanes and nonanes, or mixtures of such hydrocarbons obtained from naturally-occurring petroleum sources such as kerosene, or from synthetically prepared hydrocarbons, may sometimes be employed.

Cycloaliphatic hydrocarbons such as methylcyclohexane and aromatic hydrocarbons such as toluene may likewise be used. Toluene and isopropyl acetate are preferred solvents. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution. If an emulstion technique is to be employed in the chain extension; sometimes the excess solvent is useful and is allowed to remain during the emulsification stage.

The reactants are cooked for a period of sufficient to react most, if not all, of the hydroxy groups, whereafter the prepolymer is allowed to stand and the free NCO content determined.

Usual pHs are employed during preparation of the prepolymer the reaction preferably being maintained substantially neutral. Bases accelerate the reaction, acids retard the reaction, and preferably neither are added.

These ioscyanate group-containing polyurethanes are then reacted with an epoxy-containing compound such as glycidol, for example, at temperatures of about 25°C. to about 45°C., usually in the presence of a catalyst which promotes urethane formation.

In the process of the invention, the epoxy group-containing compound is reacted with an amine acid salt to form epoxy group-containing quaternary amine salt group-containing resins.

Examples of salts which may be employed include salts of ammonia; primary, secondary and tertiary amines, and preferably tertiary amines; salts of boric acid or an acid having a dissociation constant greater than that of boric acid and preferably an organic acid having a dissociation constant greater than about $1 \times 10^{-5}$. The presently preferred acid is lactic acid. Other useful acids include boric acid, acetic acid, propionic acid, butyric acid, hydrochloric acid, phosphoric acid and sulfuric acid. The amines may be unsubstituted amines or amines substituted with non-reactive constituents such as halogens or hdyroxylamines. Specific amines include dimethylethanolamine, salts of boric, lactic, propionic, butyric, hydrochloric, phosphoric and sulfuric, or similar salts in triethylamine, diethylamine, trimethylamine, diethylamine, dipropylamine, 1-amino-2-propanol, and the like. Also included are ammonium borate, ammonium lactate, ammonium acetate, ammonium chloride, ammonium phosphate, as well as other amine and ammonium salts as defined above.

A distinct class of amine compounds within the broader class is amine containing one or more secondary or tertiary amino groups and at least one hydroxyl group.

In most cases, the hydroxyl amine employed corresponds to the general formula:

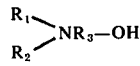

where $R_1$ and $R_2$ are, preferably, methyl, ethyl or lower alkyl groups, but can be essentially any other organic radical, as long as they do not interfere with the desired reaction. Benzyl, alkoxyalkyl and the like are examples.

$R_1$ can also be hydrogen. The nature of the particular groups is less important than the presence of a secondary or tertiary amino nitrogen atom, and thus higher alkyl, aryl, alkaryl, aralkyl, and substituted groups of the types can be present. The group represented by $R_3$ is a divalent organic group, such as alkylene or substituted alkylene, e.g., oxyalkylene or poly(oxyalkylene), or even arylene, alkarylene or substituted arylene. $R_3$ can also be an unsaturated group, e.g., an alkylene group such as —CH=CH— or

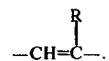

Other groups represented by $R_3$ include cyclic or aromatic groups; one type of useful amine, for instance, is represented by the formula:

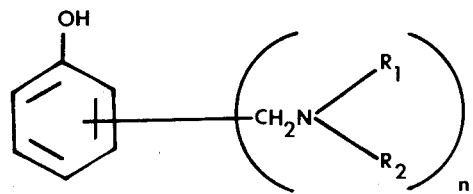

where $n$ is 1 to 3. Dialkanolamines, of the general formula $R_1N(R_3OH)_2$, and trialkanolamines, of the general formula $N(R_3OH)_3$, are also useful.

Some examples of specific amines are as follows: dimethylethanolamine, dimethylpropanolamine, dimethylisopropanolamine, dimethylbutanolamine, diethylethanolamine, ethylethanolamine, methylethanolamine, N-benzylethanolamine, diethanolamine, triethanolamine, dimethylaminomethyl phenyl, tris(dimethyl aminomethyl)phenol, 2-[2-(dimethylamino)ethoxy]ethanol, 1-[1-dimethylamino)-2-propoxy]-2-propanol, 2-(2-[]-(dimethylamino)ethoxy]ethoxy)ethanol. 1-[2-(dimethylamino)ethoxy]-2-propanol, 1-(1-[dimethylamino)-2-propoxy]-2-propoxy)-2-propanol, benzyl dimethyl amine.

Another distinct class of amine compound within the broader class is any amine containing one or more secondary or tertiary amino groups and at least one terminal carboxyl group. In most cases where a carboxyl amine is employed, it corresponds to the general formula:

where $R_1$ and $R_2$ are each preferably methyl, ethyl, or other lower alkyl groups, but can be essentially any other organic radical, so long as they do not interfere with the desired reaction. Benzyl, alkoxyalkyl, and the like are examples. $R_1$ can also be hydrogen. The nature of the particular groups are less important than the presence of a secondary or tertiary amino nitrogen atom, and thus higher alkyl, aryl, alkaryl, aralkyl, and substituted groups of these types can be present. The group represented by $R_3$ is a divalent organic groupv such as alkylene or substituted alkylene, e.g., oxyalkylene or poly(oxyalkylene), or less desirably, arylene, alkarylene or substituted arylene. $R_3$ can also be an unsaturated group, e.g., an alkenylene group.

Such amines can be prepared by known methods. For example, an acid anhydride, such as succinic anhydride, phthalic anhydride or maleic anhydride, can be reacted with an alkanolamine, such as dimethylethanolamine or methyldiethanolamine; the group represented by $R_3$ in the amines produced in such cases contain ester groups. Other types of amines are provided, for example, by reacting an alkylamine with an alkyl acrylate or methacrylates such as methyl or ethyl acrylate or methacrylate, as described in U.S. Pat. No. 3,419,525. Preferably, the ester group is susequently hydrolyzed to form a free carboxyl group. Other methods for producing amines of different types can also be employed.

It can be seen that the groups represented by $R_3$ can be of widely varying types. Some examples are: —R'—, R'OCOR'—, and —(R'O)$_n$COR'—, where each R' is alkylene, such as —CH$_2$CH$_2$—,

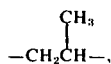

etc., or alkenylene, such as —CH=CH—, and $n$ is 2 to 10 or higher. Other groups represented by R' include cyclic or aromatic groups.

Some examples of specific amines are as follows:
N,N-dimethylaminoethyl hydrogen maleate
N,N-diethylaminoethyl hydrogen maleate
N,N-dimethylaminoethyl hydrogen succinate
N,N-dimethylaminoethyl hydrogen phthalate
N,N-dimethylaminoethyl hydrogen hexahydrophthalate
2-(2-dimethylaminoethoxy)ethyl hydrogen maleate
1-methyl-2-(2-dimethylaminoethoxy)ethyl hydrogen maleate
2-(2-dimethylaminoethoxy)ethyl hydrogen succinate
1,1-dimethyl-2-(2-dimethylaminoethoxy)ethyl hydrogen succinate
2-[2-(2-dimethylaminoethoxy)ethoxy]ethyl hydrogen maleate
beta-(dimethylamino)propionic acid
beta-(dimethylamino)isobutyric acid
beta-(diethylamino)propionic acid
1-methyl-2-(dimethylamino)ethyl hydrogen maleate
2-(methylamino)ethyl hydrogen succinate
3-(ethylamino)propyl hydrogen maleate
2[2-(dimethylamino)ethoxy]ethyl hydrogen adipate
N,N-dimethylaminoethyl hydrogen azelate
di(N,N-dimethylaminoethyl)hydrogen tricarballylate
N,N-dimethylaminoethyl hydrogen itaconate
1-(1-[1(dimethylamino)-2-propoxy]-2-propoxy)-2-propyl hydrogen maleate
2-[2-(2-[2-(dimethylamino)ethoxy]ethoxy)ethoxy]ethyl hydrogen succinate It is to be recognized that useful compositions can be produced by first reacting an amine with an epoxy-containing material, and then adding an acid and subsequently heating the reaction mixture to a suitable reaction temperature as hereinafter indicated. The amine and epoxy groups are reacted until a tertiary amine is formed. The addition of the acid then causes a tertiary amine acid salt to form, which amine acid salt, upon heating, then reacts with any residual epoxy groups present. In the event that no residual epoxy groups remain after the amine acid salt formation is complete, additional epoxy material must be added.

Regardless of the method chosen to produce the composition of the instant invention, the critical reaction which permits quaternary ammonium salt formation is that between an amine acid salt and the epoxy group or groups of the epoxy-containing material.

The compositions of the instant invention contain boron. The boron can be added to the compositions by adding an aqueous solution of boric acid, boric acid itself, or a compound hydrolyzable to form boric acid in aqueous medium. Alternatively, the amine salt used can be an amine salt of boric acid as described above.

In still another alternative, the epoxy compounds described above may be reacted with an ester of boric acid or a compound which can be cleaved to form boric acid in a medium containing water and preferably an amino containing boron ester and/or a tertiary amine salt of boric acid to produce the epoxy reaction products.

The hydrolyzable boron compound utilized in producing the reaction products or to be added to the amine salt-epoxy reaction product can be, for example, any triorganoborate in which at least one of the organic groups is substituted with an amino group. Structurally, such esters are esters of boric acid or a dehydrated boric acid such as metaboric acid and tetraboric acid, although not necessarily produced from such acids. In most cases the boron esters employed correspond to one of the general formulas:

where the R groups are the same or different organic groups. The groups represented by R above can be virtually any organic group, such as hydrocarbon or substituted hydrocarbon, usually having not more than 20 carbon atoms and preferably not more than about 8 carbon atoms. The preferred esters have alkyl groups or polyoxyalkyl groups. At least one of the organic groups contains an amine group, i.e., a group of the structure:

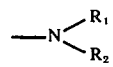

where $R_1$ and $R_2$ are hydrogen or preferably methyl, ethyl or other lower alkyl groups but can be essentially any other organic radical, so long as they do not interfere with the desired reaction. The nature of the particular groups is less important than the presence of an amino nitrogen atom, and thus higher alkyl, aryl, alkaryl, aralkyl and substituted groups of these types can be present. While both $R_1$ and $R_2$ can be hydrogen (i.e., the amino group is a primary amino group), it is preferred that at least one be an alkyl or other organic group, so that the amino group is secondary or tertiary.

The preferred boron esters correspond to the formula:

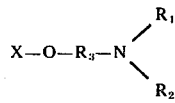

where X has the structure:

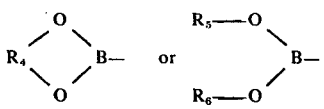

$R_3$ and $R_4$ being divalent organic radicals, such as alkylene or substituted alkylene, e.g., oxyalkylene or poly(oxyalkylene), or, less desirably, arylene, alkarylene or substituted arylene. $R_5$ and $R_6$ can be alkyl, substituted alkyl, aryl, alkaryl, or other residue from essentially any monohydroxy alcohol derived by removal of the hydroxyl group. $R_5$ and $R_6$ can be the same or different.

Examples of boron esters within the above class include: 2-(beta-dimethylaminoisopropoxy)-4,5-dimethyl-1,3,2-dioxaborolane 2-(beta-diethylaminoethoxy)-4,4,6-trimethyl-1,3,2-dioxaborinane 2-(beta-dimethylaminoethoxy)-4,4,6-trimethyl-1,3,2-dioxaborinane 2-(beta-diisopropylaminoethoxy)-1,3,2-dioxaborinane 2-(beta-dibutylaminoethoxy)-4-methyl-1,3,2-dioxaborinane 2-(beta-diethylaminoethoxy)-1,3,2-dioxaborinane 2-(gamma-aminopropoxy)-4-methyl-1,3,2-dioxaborinane 2-(beta-methylaminoethoxy)-4,4,6-trimethyl-1,3,2-dioxaborinane 2-(beta-ethylaminoethoxy)-1,3,6-trioxa-2-boracyclooctane 2-(gamma-dimethylaminopropoxy)-1,3,6,9-tetraoxa-2-boracycloundecane 2-(beta-dimethylaminoethoxy)-4-(4-hydroxybutyl)-1,3,2-dioxaborolane Reaction product of $(CH_3)_2NCH_2CH_2OH$ + lactic acid + $B_2O_3$ + neopentyl glycol A number of such boron esters are known. Many are described, for example, in U.S. Pat. Nos. 3,301,804 and 3,257,442. They can be prepared by reacting one mole of boric acid (or equivalent boric oxide) with at least 3 moles of alcohol, at least one mole of the alcohol being an amino-substituted alcohol. The reaction is ordinarily carried out by refluxing the reactants with removal of the water formed.

The amine acid salts and the epoxy compound are reacted by mixing the components in the presence of a sufficient amount of water to provide an exothermally controlled reaction with retention of epoxy groups but not sufficient to cause extremely slow or non-reaction. Typically, water is employed on the basis of about 1.75 percent to about 20 percent by weight, based on the total reaction mixture solids and preferably about 2 percent to about 15 percent by weight, based on total reaction solids.

Another measure of the amount of water which may be amployed is the equivalent ratio of water to amine nitrogen contained in the amine-acid salt. Typically the equivalent ratio of water to amine nitrogen is controlled between about 1.3 and about 16 equivalents of water per equivalent of amine nitrogen. Preferably, the ratio of water to amine nitrogen is controlled between about 1.5 and about 11.0 equivalents of water per equivalent of amine nitrogen.

While the amine acid salts and epoxy compound are reacted preferably in the presence of water, it is to be recognized that the amine acid salts and epoxy compound can be reacted and then quenched in water. Accordingly, the phrase "in the presence of water" is intended to cover both the reaction in water and the subsequent quenching in water.

The reaction temperature may be varied between about the lowest temperature at which the reaction reasonably proceeds, for example, room temperature, or in the usual case, slightly above ordinary room temperature to a maximum temperature between about 100°C. and about 110°C. Preferably, the reaction temperature is maintained at moderately elevated temperatures such as about 70°C. to about 100°C., since it has been found that quaternary ammonium groups are not generally formed at lower reaction temperatures.

A solvent is not necessary, although one is often used in order to afford better control of the reaction. Aromatic hydrocarbons or monoalkyl ethers of ethylene glycol are suitable solvents. The proportions of the amine acid salt and the epoxy compound can be varied and the optimum proportions depend upon the particular reactants. Ordinarily, however, from about one part to about 50 parts by weight of the salt per 100 parts of epoxy compound are employed. The proportions are usually chosen with reference to the amount of nitrogen in the amine acid salt, which is typically from about 0.05 to about 16 percent, based on the total weight of the amine salt and the epoxy compound. Since the amine acid salt reacts with the epoxide groups of the epoxy resin employed, in order to provide an epoxy group-containing resin, the stoichiometric amount of amine employed should be less than the stoichiometric equivalent of the epoxide groups present, so that the final resin is provided with one epoxy group per average molecule.

The particular reactants, proportions and reaction conditions should be chosen in accordance with considerations well-known in the art, so as to avoid gellation of the product during the reaction. For example, excessively severe reaction conditions should not be employed. Similarly, compounds having reactive substituents should not be utilized along with epoxy compounds with which those substituents might react adversely at the desired conditions.

The product forming the resin of the invention may be crosslinked to some extent; however, it remains soluble in certain organic solvents and can be further cured to a hard, thermoset state. It is significantly characterized by its epoxy content and chemically-bound quaternary ammonium content.

Aqueous compositions containing the above reaction products are highly useful as coating compositions and can be applied by any conventional method, such as by dipping, brushing, etc. They are, however, eminently suited to application by electrodeposition.

Where the resin of the invention was prepared employing at least in part a salt of an acid having a dissociation constant greater than $1 \times 10^{-5}$, it is not necessary to add a solubilizing agent to the product to obtain a suitable aqueous electrodepositable composition, although an acid or acidic solubilizing agent can be added if desired. Where boric acid salts or similar boron compounds, as described above, are employed to prepare the resin without the presence of a salt of an acid having a dissociation constant greater than $1 \times 10^{-5}$, compositions within the scope of this invention can be prepared by adding such an acid, the stronger acid replacing the boron compound in the resin and the boron compound forming substantially undissociated boric acid remaining in the aqueous media and being at least partially codeposited with the resin.

The presence of a boron compound in the electrodeposited film is of substantial benefit in that boron compounds apparently catalyze the cure of the deposited film, allowing lower cure temperatures and/or harder films.

The acid or acidic solubilizing agent may be any acid having a dissociation constant greater than $1 \times 10^{-5}$. Preferably, the acid or acidic solubilizing agent should be an organic acid having a dissociation constant greater than about $1 \times 10^{-5}$, the presently preferred acid being lactic acid. The addition of acid aids in stabilizing the resin, since the epoxy may tend to further polymerize on storage under highly alkaline conditions. In some cases, the acid also helps to obtain more complete dissolution of the resin. It is also desirable to electrodeposit these coatings from an acidic or only slightly basic solution (e.g., having a pH between about 3 and about 8.5), and the addition of acid thus is often useful to achieve the desired pH.

Where a carboxyl amine is employed in forming the resin of the invention, the resultant resin contains a Zwitterion, or internal salt, that is, an interaction between the quaternary group formed and the carboxyl group present, the carboxyl group displaying a dissociation constant greater than $1 \times 10^{-5}$. The resultant resin is inherently self-solubilized without the use of external solubilizing agents.

The resin of the invention when placed in a water-containing medium, such as an electrodeposition high solids feed concentrate or the electrodeposition bath, changes character. Since frequently the boron is apparently weakly chemically-bound in the resin, it is subject to cleavage from the resin molecule and, while the boron electrodeposits with the resin and is found in the electrodeposited film, the boron may be removed from the water-containing medium, in whole or in part, by separation means, such as electrodialysis or ultrafiltration, in the form of boric acid.

Thus, the resin in aqueous medium can be characterized as a water-containing medium containing (a) an ungelled water-dispersible epoxy resin having at least one 1,2-epoxy group per average molecule, and chemically-bound quaternary ammonium base salts, and (b) boric acid.

The resin contains from about 0.05 to about 16 percent by weight of nitrogen in the form of chemically-bound quaternary ammonium base salt groups; said water-containing medium containing from about 0.01 to about 8 percent by weight of boron metal contained in boric acid and/or a borate or boric acid complex. The concentration of the product in water depends upon the process parameters to be used and is, in general, not critical, but ordinarily the major proportion of the aqueous compositions is water, e.g., the composition may contain from one to 25 percent by weight of the resin. Preferably, the electrodepositable compositions of the invention contain a coupling solvent. The use of a coupling solvent provides for improved deposited film appearance. These solvents include hydrocarbons, alcohols, esters, ethers, and ketones. The preferred coupling solvents include monoalcohols, glycols, and polyols as well as ketones and ether alcohols. Specific coupling solvents include isopropanol, butanol, isophorone, Pentoxone (4-methoxy-4-methyl pentanone-2), ethylene and propylene glycol, the monomethyl, monoethyl and monobutyl ethers of ethylene glycol, 2-ethylhexanol, and hexyl Cellosolve. The presently preferred coupling solvent is 2-ethylhexanol. The amount of solvent is not unduly critical, generally between about 0.1 percent and about 40 percent by weight of the dispersant may be employed, preferably between about 0.5 and about 25 percent by weight of the dispersant is employed.

While the resins hereinabove described may be electrodeposited as substantially the sole resinous component of the electrodeposited composition, it is frequently desirable in order to improve or modify film appearance and/or film properties, to incorporate into the electrodepositable compositions various non-reactive and reactive compounds or resinous materials, such as plasticizing material including N-cyclohexyl-p-toluene sulfonamide, ortho- and para-toluene sulfonamide, N-ethyl-ortho- and para-toluene sulfonamide, aromatic and aliphatic polyether polyols, phenolic resins including allyl ether containing phenolic resins, liquid epoxy resins, quadrols, polycaprolactones; triazine resins such as melamine-based resins and benzoguanamine-based resins, especially alkylated formaldehyde reaction products thereof; urea formaldehyde resins, acrylic resins, hydroxy and/or carboxyl group-containing polyesters and hydrocarbon resins.

Other materials include esters such as butylbenzyl phthalate, dioctyl phthalate, methyl phthalylethyl glycolate, butylphthalylbutyl glycolate, cresyl diphenyl phosphate, 2-ethylhexyl diphenyl phosphate, polyethylene glycol 200 dibenzoates as well as polyesters, 2,2,4-trimethyl pentanediol monoisosbutyrate (Texanol).

In most instances, a pigment composition and, if desired, various additives such as anti-oxidants, surfactants, or wetting agents, for example, Foam Fill 639 (a hydrocarbon oil-containing inert diatomaceous earth), as well as glycolated acetylenes (the Surfynols, for example), sulfonates, sulfated fatty amides, and alkylphenoxypolyoxyalkylene alkanols, and the like, are included. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow, and the like.

In the electrodeposition processes employing the aqueous coating compositions described above, the aqueous composition is placed in contact with an electrically-conductive anode and an electrically-conductive cathode, with the surface to be coated being the cathode, while in contact with the bath containing the coating composition, an adherent film of the coating composition is deposited on the cathode. This is directly contrary to the processes utilizing polycarboxylic acid resins, as in the prior art, and the advantages described are, in large part, attributed to this cathodic deposition.

The conditions under which the electrodeposition is carried out are, in general, similar to those used in electrodeposition of other types of coatings. The applied voltage may be varied greatly and can be, for example, as low as one volt or as high as several thousand volts, although typically between 50 and 500 volts. The current density is usually between about 1.0 ampete and 15 amperes per square foot, and tends to decrease during electrodeposition.

The resin of the invention when freshly electrodeposited on the cathode contains quaternary ammonium base groups. The acid moiety which forms the salt migrates at least in part toward the anode. The electrodeposited resin further contains boron which is bonded with the basic groups present in the film which has electrodeposited on the cathode. The amounts of bonded boron in the electrodeposited film increase with increasing boron concentration in the bath to a saturation value, dependent on the number of basic groups in the concentration and the basicity of the base groups.

The film, while it may be crosslinked to some extent, remains soluble in certain organic solvents.

The freshly-deposited, uncured electrodepositable film may be characterized as follows: an epoxy resin electrodeposited upon an electrically-conductive substrate comprising an ungelled epoxy resin having at least one 1,2-epoxy group per average molecule, chemically-bound quaternary ammonium base, and from 0.01 to about 8 percent by weight of boron in the form of quaternary and amine borates and boron complexes.

The method of the invention is applicable to the coating of any conductive substrate, and especially metals such as steel, aluminum, copper, magnesium or the like. After deposition, the coating is cured, usually by baking at elevated temperatures. Temperatures of 250°F. to 500°F. for 1 to 30 minutes are typically baking schedules utilized.

During the cure, especially at elevated temperatures, at least a substantial portion of the quaternary ammonium base decomposes to tertiary amine nitrogen, which aids in the crosslinking of the coating, which upon curing is infusible and insoluble. The presence of boron salts and complexes in the film increases the rate of crosslinking, reduced the temperatures necessary to acceptable curing in commercially-reasonable times and produces coatings with improved hardness and corrosion resistance.

As set forth above, the significant resin constituents are (A) a resin having epoxy groups; (B) quaternary ammonium groups; (C) boron; and, optionally, (D) salts of acids having a dissociation constant greater than $1 \times 10^{-5}$. All these components may be qualitatively and quantitatively determined by numerous methods known in the art.

Epoxy groups may be determined by the well-known pyridinium hydrochloride method as described, for example, in Siggia, "QUANTITATIVE ORGANIC ANALYSIS VIA FUNCTIONAL GROUPS", John Wiley & Sons, Inc., New York (1963), page 242.

The total base groups present in the polymer, that is, quaternary and any amine groups present, may be determined on a separate resin sample. (When reacting the amine acid salt and the epoxy compound, in some instances not all of the amine groups of the amine salt are quaternized. Thus, some amine nitrogen may be present from reaction with the epoxy groups.) Usually the resin sample will be neutral. If, however, the resin is basic, the sample should be neutralized with a known amount of the acid present in the resin as a salt. Where the acid present in the resin as a salt is a weak acid as compared to HCl, the resin is titrated with HCl and back-titrated with sodium hydroxide on an automatic titrator. The HCl titration yields the total base groups present. The sodium hydroxide back-titration distinguishes quaternary groups from anine groups. For example, a typical analysis is conducted as follows: a 10 milliliter sample of an about 10 percent solids electrodeposition bath is pipetted in 60 milliliters of tetrahydrofuran. The sample is titrated with 0.1000 normal HCl to the pH end point. The amount of standard acid used is equivalent to the quaternary base and amine equivalents present. The sample is then back titrated with 0.1000 normal sodium hydroxide to give a titration curve with multiple end ponts. In a typical instance, the first end point corresponds to excess HCl. From the HCl titration, the second end point corresponds to the neutralization of the weak acid (for example, lactic acid) and amine hydrochloride. The difference in volume between the two endpoints gives the volume of standard base equivalent to the weak acid and amine content of the sample.

Whereas solvent such as propylene glycol is employed with, for example, tetrahydrofuran to maintain sample homogeneity, boron present will also titrate since the borons in the form present forms an acid complex with the propylene glycol. Under the conditions specified, the boric acid may be distinguished from the weak acid (e.g., lactic) by an additional inflection point in the pH titration curve. Depending on the strength of any amine group present, it may be included either in the weak acid (e.g., lactic) or boric acid portion of the titration curve.

Excess weak acid or amine salt in the electrodeposition bath may be determined by alcoholic-KOH titration. For example, a 10 milliliter sample of about 10 percent solids electrodeposition bath is pipetted into 60 milliliters of tetrahydrofuran and potentiometrically titrated with 0.1000 normal alcoholic KOH to the first end point. The amount of KOH consumed is equivalent to any acid or amine salt in the sample. In the case of neutral compositions, KOH titration is a measure of the amount of amine present in the form of amine salt since the quaternary, being a strong base, will not titrate.

In the case of the presence of acid salts of strong acids, other methods must be employed to determine acid, amine and quaternary groups present. For example, where the resin contains amine hydrochloride and quaternary hydrochloride groups, the resin may be dispersed, for example, in a mixture of glacial acetic acid and tetrahydrofuran, the chloride complexed with mercuric acetate and the sample titrated with perchloric acid to yield the total amine and quaternary groups. Separate alcoholic KOH titration will yield the amine groups persent since the quaternary is of comparable strength to the alcoholic KOH.

Boron may be determined as described by R. S. Braman, "Boron Determination," ENCYCLOPEDIA OF INDUSTRIAL CHEMICAL ANALYSIS, F. D. Snell and Hilton, Editors, John Wiley & Sons, Inc., New York (1968), Volume 7, pages 384–423. The boron may be determined on a separate sample. For example, by pipetting a 10 milliliter sample of an approximately 10 percent solids cationic electrodeposition bath into 60 milliliters of distilled water. Sufficient HCl is then added to lower the pH to about 4.0. The sample is then back-titrated with 0.1000 normal sodium hydroxide, using a Metrohm Petentiograph E-436 automatic titrator or equivalent apparatus, to the first inflection point in the pH titration curve. There is then added 7 grams of mannitol. The solution becomes acid and titration is then continued to the second inflection point in the pH titration curve. The amount of base consumed between the first and second end points is a measure of the number of moles of boric acid complex formed in the sample.

The above definition is exemplary of the technique employed to quantitatively and qualitatively identify the groups present. In specific case, analytical techniques may be adapted to a specific resin; however, in each case, consistent with the above description, there exists methods known in the art which yield appropriate accurate determinations of the significant chemical moiety content.

Illustrating the invention are the following examples, which, however, are not to be construed as limiting the invention to their details. All parts and percentages in the examples, as well as throughout this specification are by weight unless otherwise specified.

EXAMPLE A

Into a reactor equipped with thermometer, stirrer, distillation apparatus with reflux condenser and water trap, and means for providing an inert gas blanket were charged 741.6 parts of dimethylethanolamine, 714 parts lactic acid and 300 parts toluene. The reaction mixture was heated to between 105°C. and 110°C. for 4 hours. A total of 120 parts of water were collected with an index of refraction of $n_D^{25}$ 1.377. There was then added 245 parts of boric oxide, 728 parts neopentyl glycol. The reaction mixture was heated between 115°C. and 128°C. for approximately 4 hours, collecting an additional 205 parts of water with an index of refraction of $N_D^{25}$ 1.386. The reaction product had a percent nitrogen content of 4.51 and has a proposed structure of:

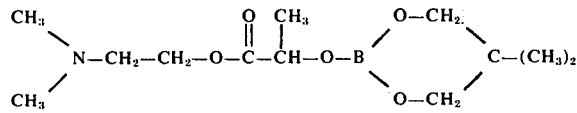

This product is hereinafter referred to as the product of Example A.

EXAMPLE I

The following reaction product was prepared in the presence of 1.88 percent water, based on total solids and at a water-to-amine nitrogen equivalency of 3.27:1.

Into a reactor equipped with thermometer, stirrer, reflux condenser and means for providing an inert gas blanket were charged 1770 parts of Epon 829, and 302 parts of Bisphenol A. The reaction mixture was heated and an exotherm was noted at 180°C. Temperature was held from 180°C. to 187°C. for 45 minutes. There was then added 790 parts of polypropylene glycol with molecular weight of approximately 625 and cooling to 130°C. There was then added 5 parts of dimethylethanolamine and the reaction heated from 130°C. to 140°C. for approximately 5½ hours until a Gardner-Holdt viscosity of L was obtained. There was then added 3.3 parts of 90 percent formic acid. The reaction mixture was cooled to 113°C. with the addition of 15.2 parts of Foam Kill 639 and 200 parts of 2-ethylhexanol. There was then added 270 parts of isopropanol at 130°C.

There was then added a solution of 319 parts of the product of Example A, with 80 parts of isopropanol, and 60 parts of water. After 30 minutes of heating between 90°C. and 93°C., there was added 660 parts of water. A clear yellow resin solution was obtained, having a solids content of 69.5. The product had the following values, reduced to 100 percent solids: epoxy equivalent 1450 and hydroxyl value 141.

EXAMPLE II

Into a reactor equipped with a thermometer, stirrer, reflux condenser and means for providing an inert gas blanket were charged 1770 parts of Epon 829, and 302 parts of Bisphenol A. The reaction mixture was heated and an exotherm was noted at 170°C. The reaction mixture was held at 180°C. to 185°C. for 45 minutes. The resultant resin had an epoxy equivalent of 330 to 350 at 100 percent solids. This resin is hereinafter referred to as the base resin.

The resin of this example was prepared in the presence of 5 percent water based on total solids, and had a water-to-amine nitrogen (of the amine acid salt) equivalency of 1.74:0.44. A dimethyl ethanolamine lactate was prepared by admixing 13.3 parts of dimethyl ethanolamine and 18.0 parts of lactic acid (85 percent solution in water). The mixture was held at 40°C. to 60°C. for a short time and there was then added 7.2 parts of isopropanol. The final composition consisted of 75 percent solids and contained 7.1 percent water.

To 500 parts of the base resin were added 105 parts of the above dimethyl ethanolamine lactate, together with 24.3 parts of water. The mixture was heated to 92°C. and the heat removed. The temperature dropped to 74°C. externally. Heating was applied after 5 minutes at 74°C. The reaction mixture was cloudy. After an additional 7 minutes, the reaction temperature was 87°C. and external heating was removed. Two minutes later the temperature was 92°C., 1 minute later 94°C., and 1 minute later 96°C. After an additional minute the temperature had reached 97°C. and the reaction mixture began to clear. After an additional minute, the reaction temperature was 101°C. In the next minute the reaction temperature dropped to 99°C. and the resin was clear. After an additional 6 minutes, the temperature dropped to 94°C. and external heating was applied, raising the temperature to 102°C. for an additional 7 minutes. The resin viscosity was determined at 50 percent solids in ethyl Cellosolve as E-F Gardner-Holdt viscosity. After an additional 30 minutes of heating the Gardner-Holdt viscosity was H-I, measured in the same manner. The resultant reaction product was a clear yellow solution at 92 percent solids.

100 parts of the above reaction product were reduced to 10 percent solids to yield an electrodeposition bath having a pH of 6.8 which was a blue-green dispersion. Aluminum strips were electrocoated at 80 volts for 30 seconds at 77°F., and the film baked at 350°F. for 30 minutes. A soft, glossy film was obtained. To the electrodeposition bath were added 100 parts of a 4.5 percent solution of aqueous boric acid. Aluminum panels were electrodeposited at 150 volts for 30 seconds at 77°F. and baked at 350°F. for 30 minutes. A hard, glossy film with reduced acetone sensitivity was obtained.

The reaction product had the following analytical values adjusted to 100 percent solids: epoxy equivalent 1050 and hydroxyl value 338. The reaction product contained 0.666 milliequivalents of quaternary ammonium lactate per gram of solids.

EXAMPLE III

The following reaction was conducted in the presence of 10 percent water, based on total solids, with a water-to-amine nitrogen equivalency of 3.56:0.44.

To 500 parts of the base resin of Example II heated to 104°C. was added a solution of 105 parts of the product of Example A and 57.3 parts of water. The temperature dropped to 79°C. The mixture was cloudy and displayed two phases. After 3 minutes of heating at 75°C., there was no exotherm. The reaction mixture was heated for 11 minutes at 75°C. to 90°C. Two phases remained. Heating was continued at 90°C. Within 7 minutes there was a noticable viscosity increase and the reaction mixture was a one-phase milky product. After 6 minutes, the temperature rose to 98°C. and no reflux occurred. After 1 minute the milky resin began to clear. After an additional minute, the resin was clear; then the mixture was heated for an additional 30 minutes.

The resin displayed the following analysis, 79 percent solids, epoxy equivalent 1385 (100 percent solids) and hydroxyl value 242 (100 percent solids).

Other reaction products can be formed using varied reactants and reaction conditions as set forth in the specification, which have utility as coating compositions.

According to the provisions of the Patent Statutes, there are described above the invention and what are now considered to be its best embodiments. However, within the scope of the appended claims, it is to be understood that the invention can be practiced otherwise than as specifically described.

We claim:

1. A method of preparing an ungelled, water-dispersible, epoxy group containing quaternary ammonium salt-containing resin comprising
   A. reacting, at a temperature of about 70 to about 100°C. in the presence of about 1.75 to about 20 percent by weight based on total reaction mixture solids of water:
      1. an organic polyepoxide having a 1,2-epoxide equivalent greater than 1, and
      2. an amine acid salt, the weight ratio of said amine acid salt to said epoxy being from about one part to about 50 parts by weight of the salt per 100 parts by weight of epoxy; and,
   B. adding to the resultant reaction product a material selected from the group consisting of aqueous boric acid solutions, boric acid, and compounds hydrolyzable to form boric acid in aqueous medium.

2. The method of claim 1, wherein said amine acid salt is a salt of an acid having a dissociation constant greater than $1 \times 10^{-5}$.

3. The method of claim 1, wherein the water is present in an amount between about 2 percent and about 15 percent by weight, based on the weight of the total reactants.

4. The method of claim 1, wherein the water is present in an amount between about 1.3 and about 16 equivalents of water per equivalent of amine nitrogen contained in said amine acid salt.

5. The method of claim 4 wherein the water is present in an amount between about 1.5 equivalents and about 11.0 equivalents of water per equivalent of amine nitrogen contained in said amine acids.

6. The method of claim 1 wherein (B) is an aqueous boric acid solution.

7. The method of claim 1 wherein said organic epoxide is a polyglycidyl ether of a polyphenol.

8. The method of claim 1 wherein said organic epoxide contains oxyalkylene groups.

9. A method of preparing an ungelled, water-dispersible, epoxy group containing quaternary ammonium salt-containing resin comprising reacting at a temperature of 70° to about 100°C. in the presence of about 1.75 to about 20 percent by weight water based on total reaction mixture solids,
   A. an organic polyepoxide having a 1,2-epoxide equivalent greater than 1, and
   B. an amine-containing material selected from the group consisting of amine salts of boric acid and amino-containing esters of boric acid, the weight ratio of said amine-containing material to epoxy being from about one part to about 50 parts by weight of salt per 100 parts of epoxy.

10. The method of claim 9 wherein the water is present in an amount between about 2 percent and about 15 percent by weight based on the weight of the total reactants.

11. The method of claim 9 wherein the water is present in an amount between about 1.3 and about 16 equivalents of water per equivalent of amine nitrogen contained in said material.

12. The method of claim 11 wherein the water is present in an amount between about 1.5 equivalents and about 11.0 equivalents of water per equivalent of amine nitrogen contained in said material.

13. The method of claim 9 wherein said organic epoxide is a polyglycidyl ether of a polyphenol.

14. The method of claim 9 wherein said organic epoxide contains oxyalkylene groups.

* * * * *